(No Model.) 5 Sheets—Sheet 3.

W. MAIN.
POWER TRANSMITTING CONNECTION FOR VEHICLES.

No. 407,086. Patented July 16, 1889.

(No Model.) 5 Sheets—Sheet 4.

W. MAIN.
POWER TRANSMITTING CONNECTION FOR VEHICLES.

No. 407,086. Patented July 16, 1889.

WITNESSES:
J. J. Kennedy
T. H. Palmer

INVENTOR
William Main
By Philipp Phelps & Hoey
ATTORNEYS (No Model.)  5 Sheets—Sheet 5.

W. MAIN.
POWER TRANSMITTING CONNECTION FOR VEHICLES.

No. 407,086.  Patented July 16, 1889.

WITNESSES:  
J. J. Kennedy  
T. H. Palmer

INVENTOR  
William Main  
BY Philipp Phelps & Hovey  
ATTORNEYS

UNITED STATES PATENT OFFICE.

WILLIAM MAIN, OF BROOKLYN, NEW YORK.

POWER-TRANSMITTING CONNECTION FOR VEHICLES.

SPECIFICATION forming part of Letters Patent No. 407,086, dated July 16, 1889.

Application filed October 28, 1887. Serial No. 253,610. (No model.)

*To all whom it may concern:*

Be it known that I, WILLIAM MAIN, a citizen of the United States, residing at Brooklyn, county of Kings, and State of New York, have invented certain new and useful Improvements in Power-Transmitting Connections for Vehicles, fully described and represented in the following specification and the accompanying drawings, forming a part of the same.

My invention has for its object the practical application of electric motors to the running of street-cars and other vehicles and the overcoming of the difficulties which have heretofore been encountered in that art. These difficulties have been numerous, and among them one of the principal has been that the starting of the car or other vehicle requires a much greater amount of power than its propulsion after the starting has been effected, necessitating, where batteries are employed, the carriage of a very great amount of battery material which otherwise would not be required, besides an otherwise unnecessary size of motor, and, where third rails or suspended wires are used to complete the circuit, necessitating both an extraordinary amount of current-power as well as of motor-power. This difficulty results, obviously, from the fact that the entire inertia of the vehicle has to be overcome at the moment of starting, and for this reason it is of special gravity in connection with the use of motors for street-cars and for purposes of locomotion generally, the load in these cases being necessarily the same at the moment of starting as afterward, while in the case of applications of electric power to the driving of machinery it is generally practicable to reduce the load at the moment of starting and to apply portions of the driven machinery or of the work to be accomplished gradually and successively.

Another serious difficulty encountered has been that the coils of the motor are, in starting and stopping the car, subjected to liability of burning out, for the reason that at such times the motor, being stationary or revolving at a slow rate of speed, develops little or no counter electro-motive force, the entire force of the current then acting upon the wires of the coils and creating great heat. It will be understood that when the motor revolves at its normal speed in the propulsion of the car it acts as a dynamo, and in that capacity tends to generate a current running counter to the main current and serving to reduce the tension of the latter, and that when the speed of rotation is materially decreased this counter electro-motive force is in a like degree diminished, and by the same amount the effect of the propelling-current upon the coils of the motor in the way of heating is increased, from which the danger to the coils arises. This liability has hitherto proved an almost insuperable obstacle to the use of electric motors for the driving of street-cars and for other purposes of locomotion, because of the frequently-recurring occasions for arresting the motion of the vehicle and the impossibility of cutting off the driving-current during the time when motion is wholly or partially arrested, because of the necessity of using the whole power of that current for again starting the vehicle. These latter difficulties have been encountered both where a current from a stationary dynamo has been used for propelling the vehicle and, in an aggravated degree, where storage-batteries carried upon the vehicle have been employed for that purpose. This arises from the fact that the most favorable conditions for the use of storage-batteries are those in which the demands upon them are constant and not subject to any sudden or extreme variations. The effect of such variations where storage-batteries in which active material mechanically applied or attached to conducting-supports is used is to cause disintegration of the masses or wads of active material at the points where they come in contact with the conducting-support, promoting the formation of sulphate at those points and rapidly effecting the separation of the active material from the conducting-support, and thus causing a liability of the active material to drop away from the conducting-supports and accumulate in the bottom of the cell.

A further most serious difficulty encountered in this art has been that of providing a mechanism for reducing the high rate of speed ordinarily requisite for obtaining from an electric motor its maximum efficiency to such a rate of speed as is required for the driving of the axle or propelling-shaft of the vehicle, this normal rate of revolution being generally about a thousand per minute and that of the driving-axle from forty to one hundred revolutions. The mechanism heretofore devised for effecting the reduction has been so considerable in size and weight as to cause a very large percentage of loss of power in friction as well as to encumber the vehicle by a large mass of inert material.

For the successful application of electric motors to street-cars a simple, compact, and light form of reducing mechanism is a practical necessity which has not yet been supplied. Such a mechanism to be effective and practicable should be capable not only of effecting the required reduction of speed, but also of gradual application to the source of power, so that the connection of the motor with the driving-axle in starting the car may be effected by degrees and without the jar and strain upon the connecting parts incident to the sudden application of the driving-power.

A further difficulty encountered arises from the fact that in car-propulsion it is convenient to place the motor upon the body of the car and to provide springs between the car-body and the truck. As the driving-connection between the motor and the driving-axle in the truck must in that case bridge a constantly-varying distance, it is necessary to provide some sort of a yielding power-transmitting mechanism, and the construction of such a mechanism which shall be at once simple and effective has been found to be a practical difficulty.

A further difficulty has arisen from the fact that in the propulsion of vehicles in which the motive power is carried upon the vehicle itself and where the vehicles are of comparatively small weight the friction is, in unfavorable conditions of track and grade, insufficient to propel the vehicle where the propulsion is effected by means of a single driving-axle. If both axles of the vehicle can be brought into simultaneous operation, this friction is very greatly increased; but such use of the two axles has been heretofore found impracticable without the use of two separate motors, one for each axle, because of the liability of one of the axles in passing over irregularities of track to gain upon the other, thus causing a binding or locking between the two when driven by rigid connections from the same shaft.

I propose, by means of the devices and mechanisms hereinafter described, to effectually overcome these difficulties in the following manner: Instead of arresting the rotation of the motor when stopping the car, I propose to interrupt the driving-connection between the motor-shaft and the driving-axle, permitting the rotation of the motor to continue at full speed. The stops of the vehicle being generally for a brief period only, this will result in but slight loss of electrical power, while it will subject neither the motor nor (where batteries are used) the battery to the effects of sudden and extreme variations in the tension of the driving-current, and it will permit the entire force of the circuit to be applied to the motor in the starting of the vehicle without danger to any of the parts of the apparatus. Moreover, the motor and connected parts, by virtue of their revolution at a high rate of speed, will maintain stored up a very considerable amount of force, which can be utilized in the starting of the car, and will, in connection with the devices which I propose to use for effecting the gradual application of power to the driving-shafts, enable the starting to be effected without the application of any considerably greater amount of power than is normally required for the propulsion of the vehicle when in full motion. In order to permit the ready making and unmaking of the connection between the rapidly-revolving motor and the driving-axles, an unusually effective and readily-controlled mechanism is required, which I have devised specially for this purpose, and which has the advantages as a reducing mechanism of extreme simplicity, compactness, and small weight, and the capability of permitting the gradual application of the power, with a favorable leverage, to any desired extent upon the side of the motor. There are two requisites of special importance in such a mechanism—to wit, that of a gradual application while the motion is being initiated, and that of positive and absolute power-transmitting capacity after the transmission of power is thoroughly under way—and these requisites I obtain by employing a friction device for initiating the transmission of power, devices of this character, as is well known, being capable of gradual application, and a gear-connection for effecting the transmission when established, and I secure the requisite absolute and delicate capacity of control by providing such an association of parts that when the train of gears which I employ is out of transmitting-connection one member of the train is revolving at a high rate of speed, but without effective engagement with the other members thereof, the driving-connection between the gears being established by the gradual application of a friction-brake to the revolving gear. It is apparent that such an application of brakes can be made in any desired degree, and consequently with any desired amount of acceleration to the driven parts, and that this application of power can always be under absolute and convenient control. The mechanism which I propose to use for this purpose consists of a novel application of what is known as the "Watt sun-and-planet gear," which in its application to the transmission of power, broadly, I have described and claimed in another application for Letters Patent filed August 27, 1887, Serial No. 248,011.

The provision which I propose to make for the requisite elasticity of connection between the driving-shafts and the motor in order to overcome the variation of distance due to the springs under the car-body and also to permit two shafts to be driven from the same motor consists in a novel application of springs. I prefer that these springs shall have a torsional action relative to the driving and driven shafts, as thus the simplest mechanism and the most effective spring action can be obtained. These springs by obviating the usual jars incident to the stopping and starting of a car where the connections between the motor-axle and the driving-axle are rigid relieve the storage-batteries upon the car of much of the liability to rapid deterioration and disarrangement hitherto experienced in the use of these batteries for the purposes of locomotion. The practical driving of cars by the use of two axles is also particularly valuable in connection with electric locomotion, since the small weight of the cars when equipped with electrical appliances is insufficient to secure a proper amount of friction between the track and the wheels if one axle alone is used as a driving-axle.

The several devices above referred to for reducing speed also have particular value in connection with electrically-driven vehicles for the reason that the average rate of speed of the driven shafts or axles upon vehicles is considerably less than that of the shafts of machinery in general, and consequently the amount of reduction required between the rapidly-revolving motor-shaft and these axles is relatively very great. A compact, light, and readily-controlled reducing mechanism is therefore a necessity for the success of electric systems of propulsion. Again, the fact that it has been found in practice desirable in the use of electric motors for car-propulsion to provide a motor for each car instead of an engine for drawing a number of cars causes the matters of space and weight of the parts necessarily connected with each motor to be factors demanding special consideration, space being limited, and it being necessary to reduce the load carried to a minimum.

While the several devices I have described herein have special adaptation and are particularly devised for use in connection with the driving of street and other cars, I contemplate as well the use thereof for the driving of all forms of vehicles—such as elevators, road-wagons, boats, &c.

As has been suggested, it is of special importance, where storage-batteries are employed, that a constant speed of rotation of motor should be maintained to avoid the disastrous effects of frequent changes of current-tension upon the battery-plates, and to maintain an even rate of speed in the motor, both when the car is running slowly in starting and rapidly when under way, it is necessary to provide a variable motion-reducing mechanism. I make this provision in part by the use of a friction device for controlling the mechanism, whereby, by permitting and regulating the amount of slip, the rate of transmission may be varied within wide limits, but primarily by providing two or more sets of reducing mechanism of different speeds, either of which may be thrown into connection, as required, without breaking the motor-circuit. By the combined use of these two provisions for change of speed I am enabled to start the car without reducing the revolution of the motor-shaft—that is, I am enabled to perform the most difficult portion of the work (that of starting the car) with a motor working under the most favorable conditions—and I secure an almost uniform electro-motive force in the driving-current—a result of the greatest importance, as above stated, where storage-batteries are employed for propulsion.

In the drawings annexed to this specification my invention is shown as applied to a street-car.

Figure 1:
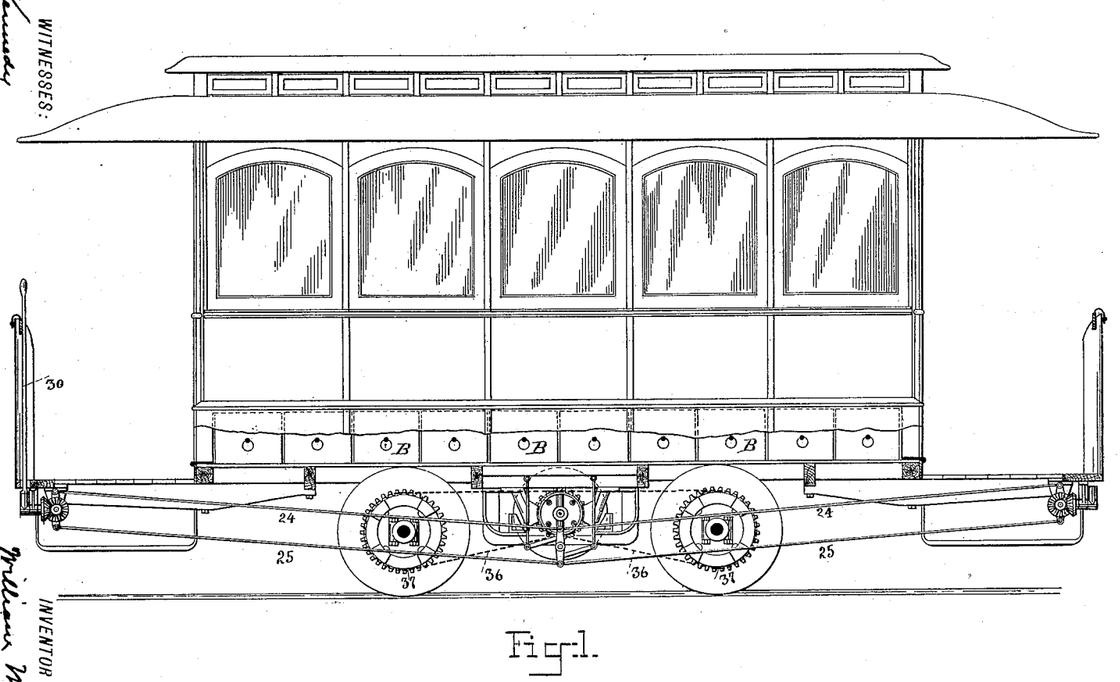
Figure 1 is a side view, partly in section, of a car to which my invention has been applied.

Suspended beneath the frame-work of the car is the motor A, the main shaft of which is connected through the motion-reducing mechanism with the axle of the car-truck. This motion-reducing mechanism will first be described.

Figure 2:
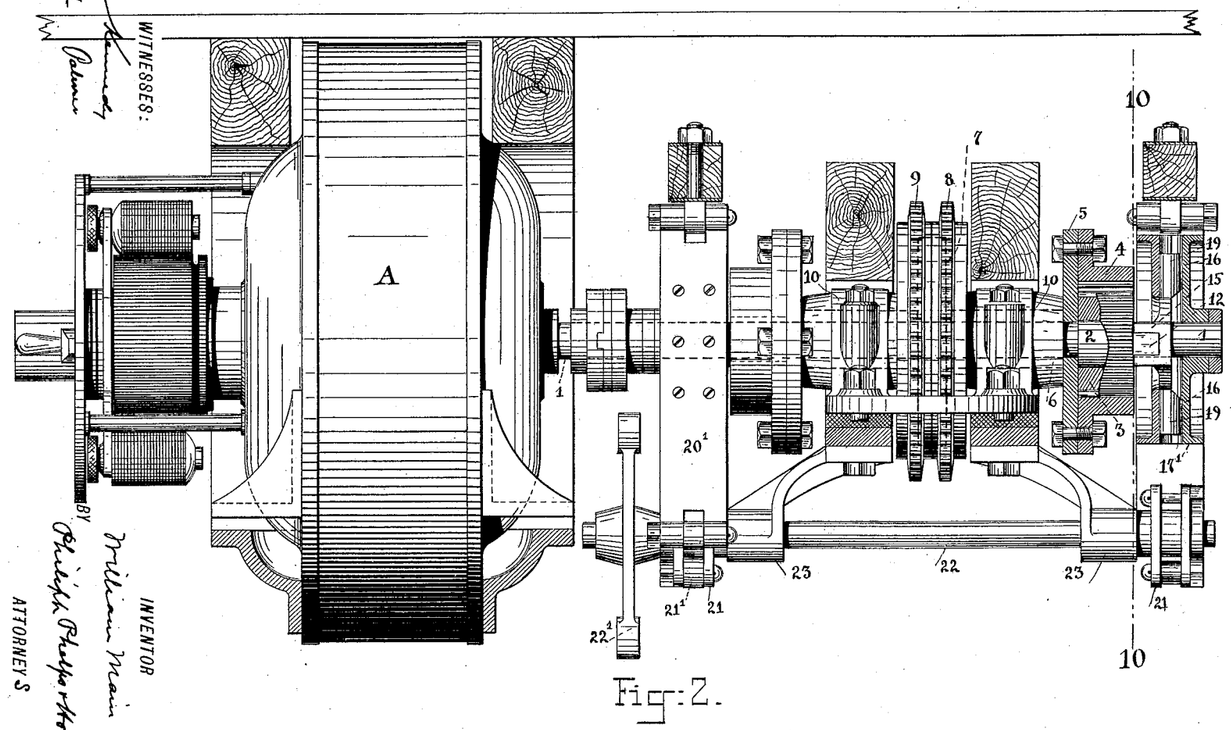
Fig. 2 is a side view of the motor and power-transmitting device mounted upon the shaft thereof.
Figure 3:
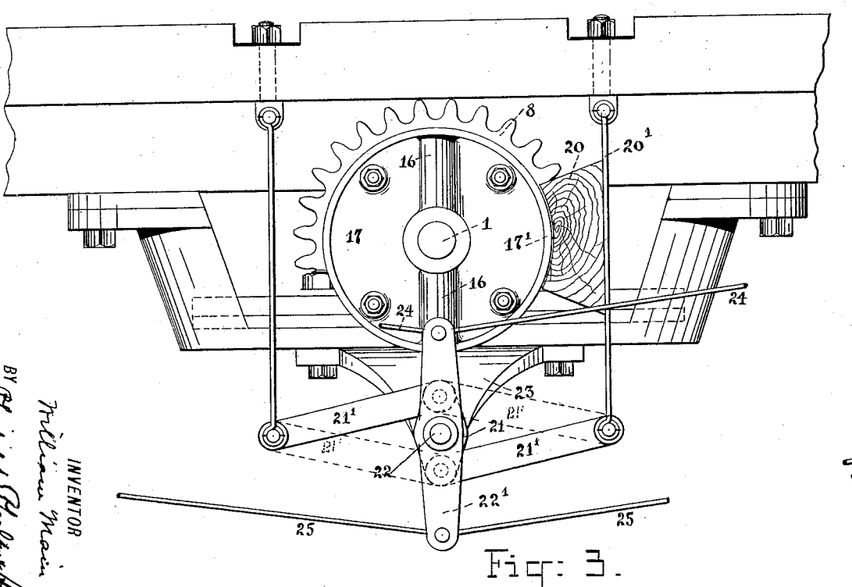
Fig. 3 is an end view of the motor-shaft and a part of the power-transmitting device upon an enlarged scale.
Figure 4:
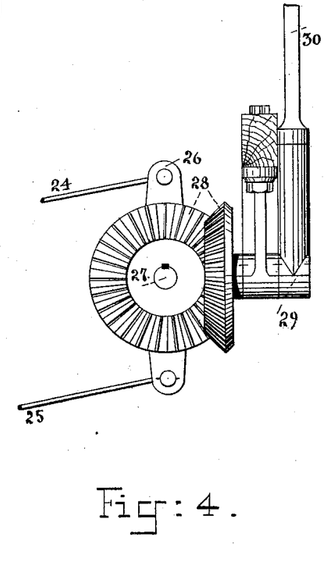
Figs. 4 and 5 are details, on the same scale, of mechanism for controlling the movement of the car.
Figure 5:
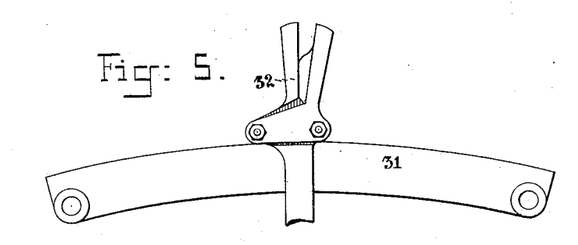
Figure 6:
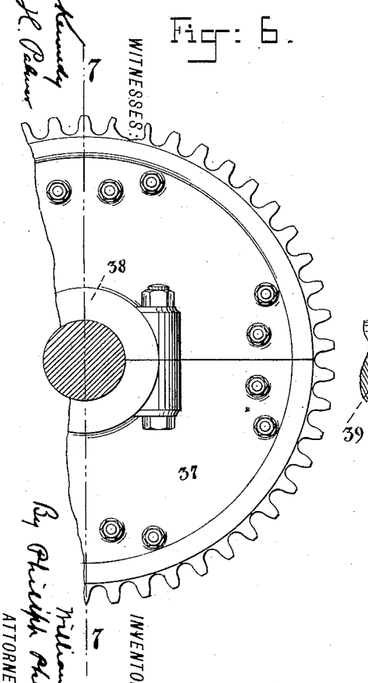
Figs. 6, 7, and 8 represent, on the same enlarged scale, the torsional spring connecting device between the motor and the driven axle, Fig. 6 being a side view, Fig. 7 a vertical section on the line 7 7, Figs. 6 and 8, and Fig. 8 a side view, partly in section, on the line 8 8, Fig. 7.
Figure 7:
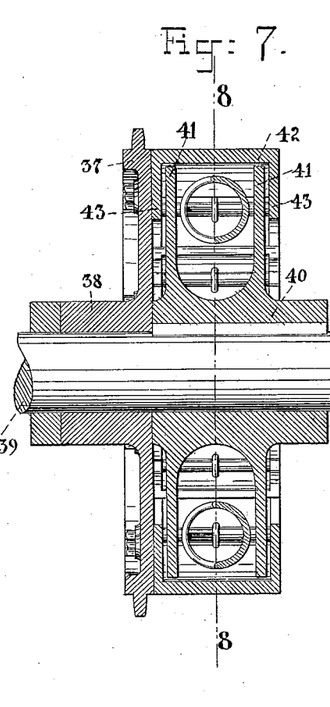

The shaft 1 of the motor carries fast upon it an eccentric 2, which moves freely in a circular opening within gear-wheel 3, which gear-wheel constitutes the fixed or initial member of the "sun-and-planet" series of gears above referred to. Outside of and about this gear-wheel is an annular gear 4, concentric with the driving-shaft 1 and bolted to a flange 5 of a sleeve or hollow shaft 6, (shown in Fig. 2 partly by broken lines,) mounted upon the main shaft and carrying at its inner end a flange 7, upon which is formed a sprocket-wheel 8, from which the power is transmitted to one of the car-axles. The sleeve 6 rests in suitable bearings 10, secured to the car-frame. On the inner side of sprocket-wheel 8 is arranged upon the motor-shaft another sprocket-wheel 9, rigid with wheel 8, and a second set of devices identical with those above described, except that the ratio between the inner and outer gear-wheels is varied, this additional mechanism being provided in order that it may be possible to change the speed of the car without changing that of the motor.

Figure 9:
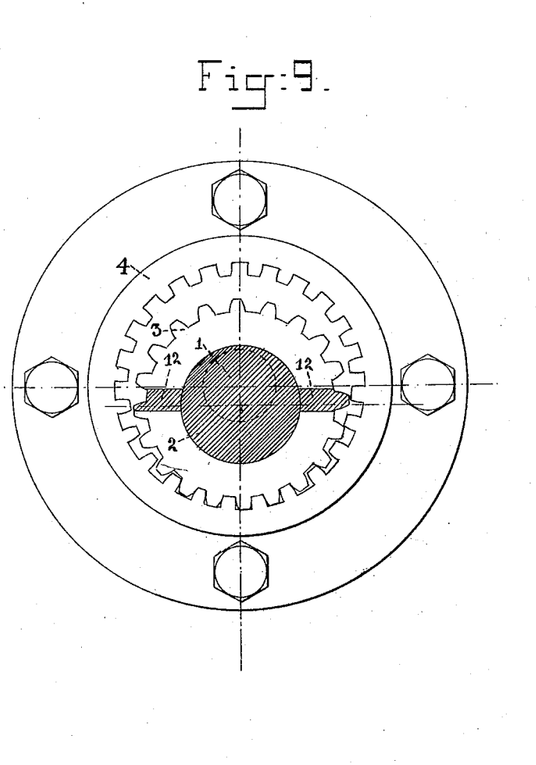
Figs. 9 and 10 are detail views, on an enlarged scale, of the motion-reducing device, Fig. 9 being a section on line 10 10, Fig. 2, the point of view being to the right of said line, and Fig. 10 a section taken on same line, the point of view being to the left of said line.
Figure 10:
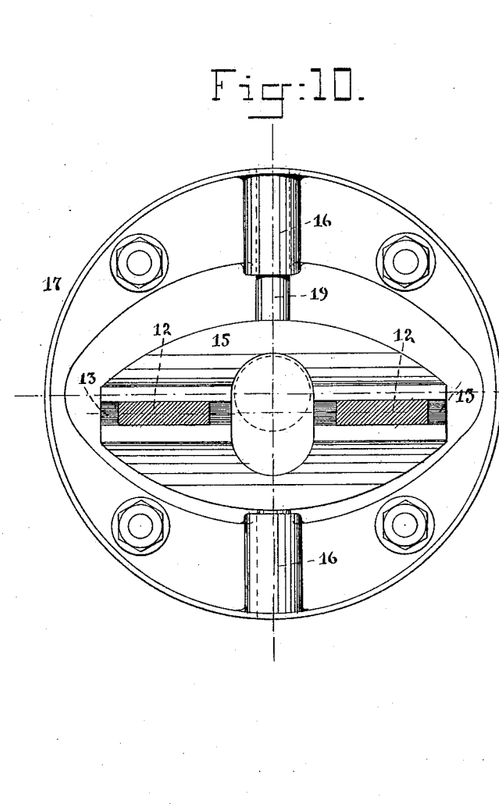

Upon the inner gear-wheel 3 (see particularly Figs. 2, 9, and 10) are cast lugs 12, fitted to and adapted to slide in a recess or channel 13, formed in a cross-head 15. This cross-head 15 is in turn provided with cylindrical lugs 19, fitting cylindrical sockets 16, formed in a pulley 17, mounted upon and rotating freely about the main shaft. Pulley 17 has a rim 17', which serves as a friction-wheel. The cross-head 15 has an oblong central opening which permits it to move in the direction of its lugs 19 over the main shaft 1. It is obvious that the gear 3 and the pulley 17 will maintain fixed positions relative to each other as regards rotation, their absolute relative positions changing as the shaft 1 revolves to the extent of the sliding motion of the cross-head 15 in pulley 17 and of lugs 12 in channel 13, caused by the eccentric position of the gear 3 with reference to the axis of the pulley 17, the lugs 12 and cross-head 15 constituting double slides moving in right lines and uniting the gear and the pulley as regards circular motion. Consequently when the pulley 17 freely revolves about its axis the gear 3 is also free and will convey no power from the shaft to the outer gear 4. When, however, the pulley 17 is locked or held fast in one position, the gear 3 will be carried about by the eccentric in a position constantly parallel to itself and will communicate to the outer gear 4 a rotating motion reduced to an extent dependent upon the ratio between the two gears. The amount of this reduction may be readily calculated according to well-known rules which require no special explanation here.

It is necessary to provide devices for the locking of the pulley 17 in order to effect the transmission of power through the gears, and for this purpose I prefer to use a friction-clutch, although any other form of clutch mechanism—for instance, a spring-clutch—may be employed, as illustrated in Figs. 1, 2, 3, and 4, wherein brake-shoes 20 are shown attached to pivoted hangers 20', the lower ends of these hangers being connected by rods 21' to a cross-piece 21, fastened upon a shaft 22, mounted in bearings 23, which shaft is revolved, as desired, to throw the shoes to or from the rim 17 by rods 24 and 25, two sets of which are provided, passing from cross-piece 22', fixed upon shaft 22, to each end of the car and connecting at each end with a cross-bar 26 upon a shaft 27, the latter shaft being connected by bevel-gears 28 with a shaft 29, attached to a lever 30, adapted to move along a segmental bar 31 and to be arrested by a spring-catch 32 at any desired point thereof, in the manner usual with railroad-switch and similar levers. In the mechanism shown two of these sets of brake-shoes are employed, one for each of the pulleys 17, so connected with their cross-pieces 21' that in one position of the shaft 22 one of the said pulleys is arrested and the other released, and in the other position thereof the action of the shoes upon the pulleys is reversed. The arrangement of the second set of rods 21' is shown in broken lines in Fig. 3. By the use of this mechanism the position of the controlling-shaft 22 may be determined and adjusted from either end of the car by the use of the appropriate lever, and either one of the two sets of gears may thus be brought into operation, according to the speed to be given to the car, and both may be thrown out of operation in order to arrest the action of the motor upon the car-axles by causing the shaft to assume an intermediate position wherein neither of the pulleys will be held. If more than two speeds are desired for the car, the number of sets of gears and controlling mechanisms will be accordingly increased. The motor is driven by the current from storage-battery B or other source of electricity. The usual springs between the car-body and the truck are supposed to be used, though not shown in the drawings.

Figure 8:
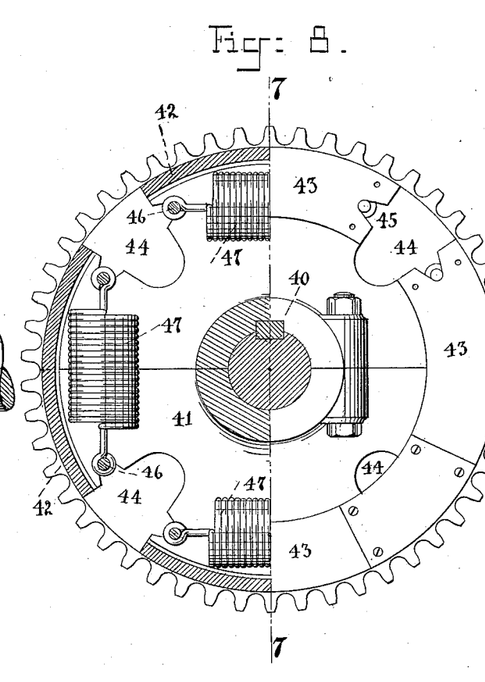

Power is transmitted from sprocket-wheel 8 to one of the car-axles and from wheel 9 to the other by means of chains 36, passing one to the forward and the other to the rear axle and engaging with other sprocket-wheels 37, mounted thereon in a manner and with connected parts which will now be described. The sprocket-wheel 37 consists in each case of a circular flange carrying the sprocket-teeth and integral with a hub 38, mounted so as to revolve freely upon the axle 39. Adjoining the hub 38 is a sleeve 40, keyed to the axle and provided with two circular flanges 41, parallel to each other and a short distance apart. To the flange 37 is bolted a circular cap 42, having two inwardly-projecting circular flanges 43 embracing the flanges 41. Flanges 41 are provided with a suitable number of recesses or openings 44, of which four are shown in this instance, and the flanges 43 are provided with an equal number of similar openings so placed as to accurately register with the recesses 44. In both the flanges 41 and 43 and in the sides of the openings above described are placed notches 45, registering with each other in all the flanges and adapted to serve as bearings for transverse rods 46, which rest in them, and which rods are connected in pairs by springs 47, which springs will normally hold the two sets of flanges in such relation to each other that the openings or recesses therein will precisely register, as shown in Fig. 8. With this construction the stress of the motor when thrown upon the flange 37 will tend to turn the flange 37 and the hub 38 upon the axle, and this tendency will be resisted by the rods 46 and springs 47. The springs are of such tension as to permit a certain small amount of movement between the parts which they connect, but after permitting such slight movement their strength is sufficient to transmit the driving-power of the motor. It results that the flange 37 and the sleeve 40, and consequently the axle 30, after the play of the springs is exhausted, move together and give motion to the car, and it will be observed that it is immaterial in which direction the flange 37 is caused to revolve, the result with either direction of motion being the same so far as the action of the springs and flanges is concerned. In other words, the car may be caused to move forward or backward with precisely the same operation in each case of the power-transmitting mechanism by reversing the direction of rotation of the motor-shaft. The springs serve to prevent irregular or jerking action in the transmission of the power of the motor to the axles and take up the jar and strain which would otherwise be present in the starting and stopping of the car. This capability of the springs is particularly important where the power is transmitted through the medium of chains, since chains in such mechanism, where the mountings are rigid, are caused to slacken by any irregularities in the connected parts caused by imperfect construction or resulting from wear, and as a result the chains are rapidly and irregularly worn and create a constant clanking. With this device, however, perfect tension is at all times maintained and a minimum of wear results without noise. Moreover, the springs take up and neutralize whatever variations in the distance between the driving and driven shafts are caused by the bearing-springs between the car-body and the truck. These variations are reduced to a minimum by the relative position of the driving and driven shafts, as will appear by inspecting Fig. 1, wherein the chains are seen to be nearly horizontal, and such as remain are effectually taken up by these springs. These springs have the further function of enabling the car to be practically driven by connection with both truck-axles. As is well known, it is impracticable to connect one driving-shaft with two connected driven shafts by means of chains in ordinary rigidly-mounted mechanism, for the reason that it is impossible to maintain exactly the same adjustment for both chains and connected parts, and a certain amount of binding is certain to result, sufficient at length to absolutely arrest the operation of the mechanism. This is particularly true where, as in this case, the two driven shafts are connected through the medium of an uneven track, whereon there is a constant liability on the part of one shaft to gain or lose upon the other. The springs above described, however, serve to neutralize, also, these relative irregularities, and the two axles are simultaneously driven without in the least interfering with each other. This is a feature of very considerable importance in many applications of power, but of special value in the driving of cars, for the reason, as above suggested, that it is desired in this case to obtain a maximum amount of friction between the drive-wheels and the track.

The motion-reducing mechanism above described has a signal advantage over similar devices with which I am acquainted in that it enables the power of the motor-shaft to be applied with the utmost advantage to the starting of the car. At this moment great power, as well as the gradual application of that power, is a necessity. My friction-brake controlling the operative engagement of the driving-gear permits the entire force of the motor-shaft rotating at full speed and the full momentum of the rotating parts to be applied with any desired leverage and with as gradual an accession of speed as is advantageous. The usual short stops are made without arresting the rotation of the motor, and thus a considerable amount of power is stored up in these revolving parts as momentum, which can be applied at the moment of starting. The control exercised over the whole mechanism is absolute, and its operations can be precisely and delicately modulated. These advantages flow directly from the fact that the peculiar reducing-gear employed is out of operation when one of its members revolves freely, and that consequently it may be made operative by the application of brakes to the revolving member, the mechanism to which the brake is applied becoming, on their complete application, a fixed part of the frame-work of the machine—an abutment upon which the transmitting-gear rests while operative. These devices of my invention, as also the spring-connection between the motor-shaft and the driven axle, I desire to claim, broadly, in combination with a vehicle and electric motor, not limiting myself to the particular form of construction of the devices by which the arrest of the rotating member of the series of gears is effected or of the particular construction of the spring mechanism employed.

The sun-and-planet arrangement of connecting-gears has particular adaptation to use upon vehicles driven by electric motors in that it is in the highest degree compact, light, and readily controlled for the amount of reduction which it effects, and I do not limit myself to the particular arrangement shown of the several parts of that gear, as the relation of the driving to the driven gear may be reversed or variations made in the number or arrangement of the several parts without departing from the main feature of my invention.

Primary batteries may be used instead of secondary or storage batteries without departing from my invention.

By the phrase "independent of the motor-circuit," as used in the claims of this application, I mean to exclude that construction only in which the motor-circuit is completely interrupted upon the stoppage of the vehicle.

By the expression "traction-shaft," as used in the claims, I intend either the vehicle-axle itself or any intermediate shaft between the vehicle-axle and the speed-reducing mechanism.

Having thus described my invention, what I claim, and desire to secure by Letters Patent, is—

1. The combination of a storage-battery, an electric motor, a driven mechanism, and a clutch independent of the motor-circuit for establishing or breaking connection between the motor-shaft and the driven mechanism without interfering with the continuity of the said motor-circuit, and consequently without interrupting the uniform discharge of the battery, substantially as set forth.

2. The combination of a storage-battery, an electric motor and its circuit-controlling devices, a speed-transmitting mechanism between the motor-shaft and the driven mechanism, and a friction-brake for controlling said transmitting mechanism, whereby by a greater or less pressure the speed of transmission may be varied without interfering with the motor-circuit and without interrupting the discharge of the battery, substantially as set forth.

3. The combination of a storage-battery, an electric motor, a driven mechanism, and means independent of the motor-circuit for establishing or breaking connection between the motor-shaft and the driven mechanism without interfering with the continuity of said motor-circuit, and consequently without interrupting the discharge of the battery, substantially as set forth.

4. The combination of a vehicle, a storage-battery and an electric motor mounted thereon, and means independent of the motor-circuit for establishing or breaking connection between the motor-shaft and the driven mechanism without interfering with the continuity of said motor-circuit, and consequently without interrupting the discharge of the battery, substantially as set forth.

5. The combination of a vehicle, a battery, an electric motor, the motor and battery being mounted upon the vehicle, sun-and-planet gear-wheels connecting the motor-shaft with the driving-axle of the vehicle, and means whereby the oscillating gear-wheel of the sun-and-planet series may be arrested or permitted to revolve freely, substantially as set forth.

6. The combination of a vehicle, a battery and electric motor mounted thereon, two or more sets of sun-and-planet gear-wheels between the shaft of the motor and the driving-axle of the vehicle, the wheels of each set being differently proportioned to each other, a locking device for each of said sets of gear-wheels for bringing it into operative connection with the motor-shaft, and means for bringing into operation any one of said locking devices, substantially as described.

7. The combination of a vehicle, a battery and electric motor mounted thereon, a train of sun-and-planet gear-wheels connecting the motor-shaft with the vehicle-axle, and a friction-brake controlling the operative engagement of the shaft with the gear-wheels, the transmitted speed increasing relatively to the amount of pressure applied to the brake, substantially as described.

8. The combination of a vehicle, an electric motor mounted thereon, a train of gear-wheels connecting the motor-shaft with the vehicle-axle, one of said gear-wheels having an oscillating and also a rotary motion, a rotatory pulley normally rotating with said oscillating gear, and friction-brakes for restraining the rotation of said pulley and thereby bringing the train of gear into operative engagement with the shaft, substantially as described.

In testimony whereof I have hereunto set my hand in the presence of two subscribing witnesses.

WILLIAM MAIN.

Witnesses:
   J. J. KENNEDY,
   G. M. BORST.